UNITED STATES PATENT OFFICE.

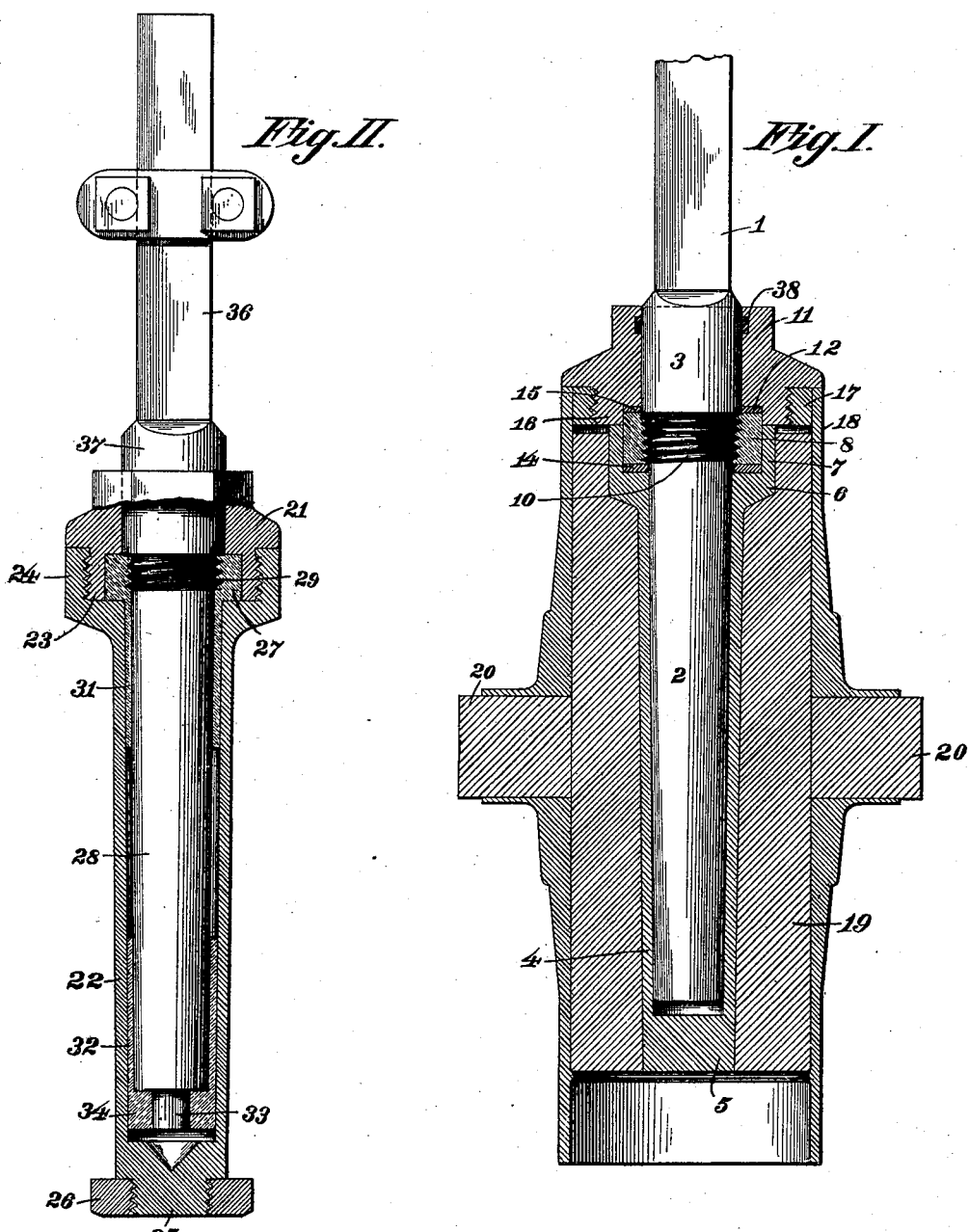

WILLIAM H. MATTHEW, OF ZANESVILLE, OHIO.

AXLE-BOX AND AXLE CONNECTION.

SPECIFICATION forming part of Letters Patent No. 660,965, dated October 30, 1900.

Application filed May 2, 1900. Serial No. 15,217. (No model.)

*To all whom it may concern:*

Be it known that I, WILLIAM H. MATTHEW, of Zanesville, in the county of Muskingum, State of Ohio, have invented certain new and useful Improvements in Axles and Box and Axle Connections, of which the following is a complete specification, reference being had to the accompanying drawings.

The object of my invention is to produce improvements in that class of box and axle connections in which the box is secured to the axle by a nut at the inner end of the box, whereby the connection may be rendered snug, durable, and dust-proof, whereby the form of the spindle lends maximum strength to the axle, and whereby the connection between the box and the axle may be readily disassembled from the axle whenever and for whatsoever purpose desired. Subordinate to the general object of my invention, as above stated, is the specific purpose of adapting my axle (shown in United States Patent No. 479,223, issued July 19, 1892) for use with inside box and axle connections as distinguished from the ordinary nut screwed upon the outer end of the spindle.

In the accompanying drawings, Figure I is a plan view of a portion of an axle with its spindle and box united by my improved connections, all of the members except the axle being shown in section. Fig. II is a view similar to Fig. I, illustrating my invention as adapted to a special form of axle provided with removable bearing members.

Referring to the numerals on the drawings, 1 indicates a portion of an axle provided with a spindle 2, the axle and spindle proper being united by an enlarged cylindrical part or collar 3, the purpose of the collar being to afford increased strength at the point of greatest strain.

4 indicates an axle-box which properly fits the spindle 2 and is closed at its outer end, as indicated at 5. The box is preferably provided at its inner end with a shoulder 6, in which is a recess formed by an annular wall 7. This recess is designed to accommodate a bearing and retaining ring 8, that is internally threaded to fit external threads 10, formed upon the spindle adjacent to the collar 3, against which the ring 8 when in place is designed to abut.

11 indicates a nut which closely fits the collar 3 and which is designed to be assembled in abutment against the end of the shoulder 7. It is provided with an annular recess 12, which corresponding in diameter to that defined by the wall 7 is designed to accommodate the ring 8, so that when the nut 11 is secured against the end of the box, as illustrated, it holds the box snugly in place, the ring 8 preventing movement thereof in either direction. Around the spindle in the bottom of the recess defined by the walls 7 I prefer to provide a washer 14, against which the ring 8 bears, and upon the opposite side of the ring within the recess 12 a corresponding washer 15.

For assembling the nut 11 with the box in the manner above specified I prefer to provide upon the nut 11 a reduced end 16, which is externally threaded to fit an internally-threaded annular flange 17, formed with or united to a metallic sheath 18, which constitutes the outer surface of the hub, within which the box is seated, the interior portion 19 of the hub being preferably made of wood and the parts 4, 18, and 19 being by any suitable means assembled in fixed relations to one another. It may be observed for completeness of description that 20 indicates spokes which project from the sheath 18 of the hub.

In Fig. II of the drawings I illustrate means for securing a nut 21, corresponding to the nut 11, above described, directly to the box 22, corresponding to the box 4, previously referred to. This illustration is intended to show how the box may be adapted to any form of wooden hub and without reference to the structural details of any other part of the hub than the box. In this form of embodiment of my invention the reduced end 23 of the nut 21 is externally threaded to fit within an internally-threaded annular wall 24 on the end of the box 22, corresponding substantially to the wall 7 of the box 4. Upon axle-boxes to which the nut is directly secured—such, for example, as the box 22—I provide a reduced end 25, upon which screws a nut 26, by which the box may be directly fixed to a hub without respect to the structural details of the hub.

In the form of embodiment of my invention illustrated in Fig. II, I provide an internally-threaded annulus 27, which, corresponding to the ring 8, is secured to its spindle 28, as by means of screw-threads 29, corresponding to the screw-threads 10, above referred to. The annulus 27 fits within a recess within the reduced end 23 of the nut 21 and differs only from the ring 8 in that it is provided with a tubular extension 31, which fits snugly between the exterior of the spindle 28 and the interior of the box 22. To accommodate the extension 31, which constitutes one portion of a removable bearing, the internal diameter of the box must be somewhat larger than the external diameter of the spindle 28. Otherwise the spindle 28 may correspond in all respects to the spindle 2. I prefer, however, to make the extension 31 shorter than the spindle 28 and to provide upon the end of the spindle a thimble 32, which is irrevolubly secured in place, as by a transversely-oblong reduced end 33 of the spindle fitting into a corresponding aperture in the end of the thimble. Washers corresponding to the washers 14 and 15 may be employed upon the opposite sides of the annulus 27 or they may be dispensed with in each instance, if preferred. The spindle 28 is united to its axle 23, as by a cylindrical collar 37, the screw-threads 29 being formed adjacent to the outer end of the collar, as illustrated in Fig. II as well as in Fig. I.

Within the nut which is designed to secure the box or hub to the axle I provide in an annular groove a washer 38, which bearing against the cylindrical face of the collar of the axle affords, in connection with the other parts of my device, effectual protection against intrusion of dust to the interior of the working parts. This construction is clearly illustrated in Fig. I of the drawings.

By way of description of the operation of my device it appears sufficient to state that when the ring 8 or the equivalent annulus 27 is secured in place and the box revolubly secured against said ring or annulus by its nut the box is free to turn upon its spindle, while the nut revolves upon its collar formed upon the spindle, the ring or annulus serving as a bearing or means of retention of the box and nut respectively. It should be observed also that the relations of the nut, box, and ring or annulus afford secure protection from access of dust or the like to the bearing-surface of the spindle.

What I claim is—

1. The combination with a spindle, axle-box, and ring removably secured to the spindle, of a nut securable to the axle-box, and opposite recesses in the nut and end of the axle-box, respectively, said recesses being adapted to receive and conjointly to closely fit the ring substantially as and for the purpose specified.

2. The combination with a spindle and annulus threaded thereto near the inner end of the spindle, of a tubular extension upon the annulus fitting the smooth exterior surface of the spindle, a thimble secured to the end of the spindle, and an axle-box working upon the thimble and extension and revolubly secured to the annulus, substantially as set forth.

3. The combination with a spindle, annulus and tubular extension secured near the inner end thereof, of a reduced end upon the spindle, irrevolubly fitting within an aperture in the end of the thimble fitting on the end of the spindle, an axle-box fitting upon the thimble and extension respectively, and means for securing the axle-box revolubly to the annulus, substantially as set forth.

4. The combination with an axle, spindle, and intermediate cylindrical collar, of a box and nut adapted to be secured directly or indirectly to the box, means for fixing the position of the box and nut revolubly upon the spindle and collar respectively, and a washer within the recess in the inner wall of the nut working against the collar, substantially as set forth.

In testimony of all which I have hereunto subscribed my name.

WILLIAM H. MATTHEW.

Witnesses:
J. J. MARTIN,
M. R. MCCLELLAND.